United States Patent
Smith

(10) Patent No.: US 12,200,093 B2
(45) Date of Patent: Jan. 14, 2025

(54) SYSTEM AND METHOD FOR MEASURING SMALL FREQUENCY DIFFERENCES

(71) Applicant: Seakr Engineering, Inc., Centennial, CO (US)

(72) Inventor: John Eric Smith, Lakewood, CO (US)

(73) Assignee: SEAKR Engineering, LLC, Centennial, CO (US)

(*) Notice: Subject to any disclaimer, the term of this patent is extended or adjusted under 35 U.S.C. 154(b) by 144 days.

(21) Appl. No.: 17/528,085

(22) Filed: Nov. 16, 2021

(65) Prior Publication Data
US 2022/0239461 A1 Jul. 28, 2022

Related U.S. Application Data

(60) Provisional application No. 63/142,932, filed on Jan. 28, 2021.

(51) Int. Cl.
*H04L 7/027* (2006.01)
*H04B 7/185* (2006.01)
*H04L 27/26* (2006.01)

(52) U.S. Cl.
CPC ......... *H04L 7/027* (2013.01); *H04B 7/18513* (2013.01); *H04L 27/2657* (2013.01)

(58) Field of Classification Search
CPC . H04L 7/027; H04L 27/2657; H04L 27/0014; H04B 7/18513; H04W 56/0035
See application file for complete search history.

(56) References Cited

U.S. PATENT DOCUMENTS

| | | | |
|---|---|---|---|
| 5,473,274 A | 12/1995 | Reilly et al. | |
| 5,619,211 A * | 4/1997 | Horkin | H04B 7/1855 342/356 |
| 7,102,692 B1 | 9/2006 | Carlsgaard et al. | |
| 2002/0029117 A1 | 3/2002 | Ito et al. | |
| 2003/0141938 A1 | 7/2003 | Poklemba et al. | |
| 2009/0310712 A1* | 12/2009 | Nakatani | H03L 7/18 375/316 |

(Continued)

OTHER PUBLICATIONS

International Search Report and Written Opinion dated Feb. 14, 2022, for PCT Application No. PCT/US21/72442, filed Nov. 16, 2021, 14 pages.

(Continued)

*Primary Examiner* — Atique Ahmed
(74) *Attorney, Agent, or Firm* — Morrison & Foerster LLP

(57) ABSTRACT

The present disclosure is directed to a system and method for measuring small frequency differences between two signals quickly and with high precision. In particular examples, an offset between two clock signals on a satellite can be accurately determined in a time period enabling rapid clock synchronization useful in position, navigation, and tracking (PNT) and satellite communications applications. The system and method may also be implemented in constellation of cooperative satellites or other space-borne and high-altitude assets, wherein a plurality of such assets are accurately time-synchronized and more accurate ensemble average calculations are enabled using two-way time transfer (TWTT) protocols. A particular application presently disclosed measurement and correction of very small frequency differences between an atomic clock signal and a tunable clock signal.

19 Claims, 8 Drawing Sheets

(56) References Cited

U.S. PATENT DOCUMENTS

| | | | |
|---|---|---|---|
| 2011/0194656 A1* | 8/2011 | Shaked | H04L 27/3863 |
| | | | 375/346 |
| 2016/0013795 A1* | 1/2016 | Sastrawan | H03L 1/026 |
| | | | 331/17 |
| 2016/0079994 A1* | 3/2016 | Lee | H03M 1/46 |
| | | | 341/118 |
| 2019/0007055 A1* | 1/2019 | Nelson | H03K 5/133 |

OTHER PUBLICATIONS

International Preliminary Report and Written Opinion mailed Aug. 10, 2023, for PCT Application No. PCT/US2021/072442, filed Nov. 16, 2021, six pages.

* cited by examiner

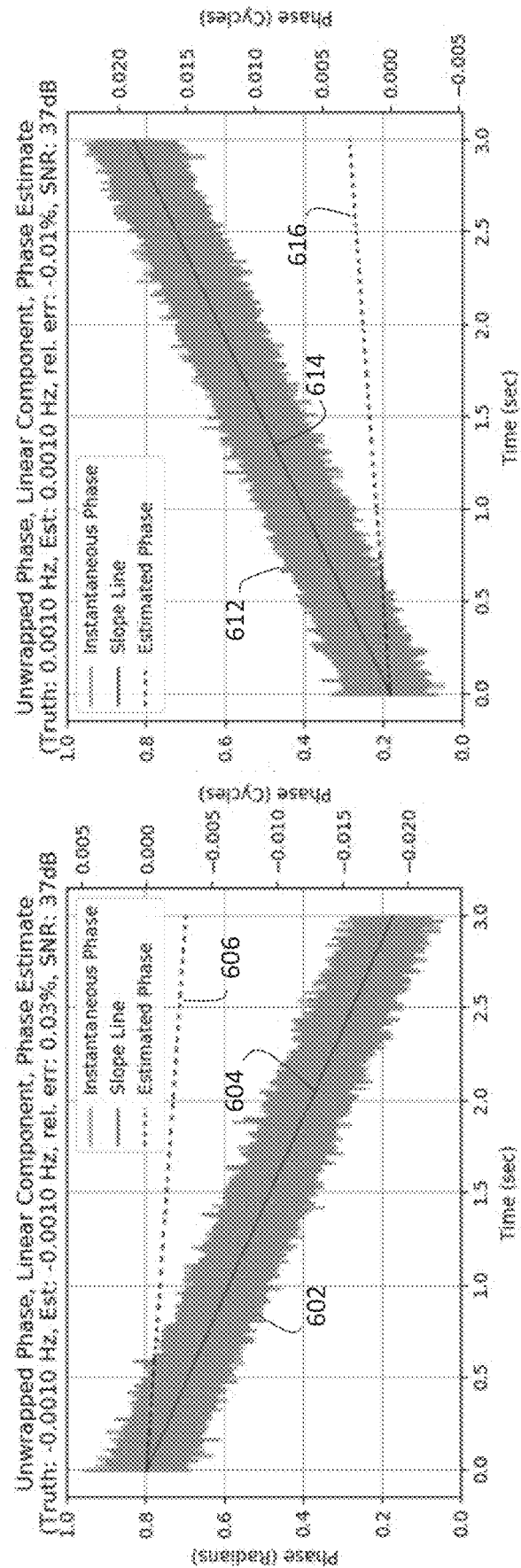

SYSTEM AND METHOD FOR MEASURING SMALL FREQUENCY DIFFERENCES

CROSS-REFERENCE TO RELATED APPLICATIONS

This application claims the priority benefit of U.S. Provisional Application No. 63/142,932, filed Jan. 28, 2021, which is hereby incorporated by reference in its entirety.

TECHNICAL FIELD

The technology described herein relates to a system and method for measuring frequency differences between two signals, such as two clock signals on a satellite. In particular, the disclosed system and method may be used to determine very small frequency differences between an atomic clock signal and a tunable clock signal to properly synchronize the clocks locally and to enable a more accurate ensemble clock average in a constellation of satellites.

BACKGROUND

As satellite processing systems increase in speed and complexity, and as cooperative constellations of satellites continue to increase in size and number, the need for accurate clock signals locally and at the constellation level is becoming increasingly important. Many functions in satellites and constellations of satellites rely on precise knowledge of time. For example, position, navigation, and timing (PNT) applications require precise synchronization of multiple clocks both locally on each satellite and as a contribution to an ensemble average clock for a group of satellites. Another example comes about in sensing applications, specifically involving two (or more) satellites where precise time-of-arrival (ToA) knowledge directly effects performance. Consider a notional but realistic scenario where two satellites at an altitude of 1,000 km, in the same plane, separated by 5,000 km, are used to geolocate targets. For this example, the targets are located at sea level to simplify the problem. In the two-satellite case, if there is a relative clock error of 10 nS (10E-9 seconds) between the clocks on the two satellites, a displacement error of approximately 2.3 meters would result. On the other hand, if the two clocks have exactly the same time (that is, a relative clock error between the two satellites is 0 nS), but were offset by 1000 nS relative to absolute time, such as defined by a ground-based master clock reference, the resulting displacement error would be approximately 7 mm (7E-3 meters). Thus, the impact of a very small relative time error between satellites, compared to an absolute error of the two satellites with respect to a master clock, is over 30,000 times greater, underscoring the importance of precise time synchronization locally and between satellites. Further, it is noted that use of GNSS as a method for synchronizing satellites in a constellation is vulnerable to spoofing and other means of degrading their accuracy such that, for certain applications (e.g., national security, military, and other implementations), GNSS is not considered to be a reliable time source. The present disclosure, described in detail below, is directed at ensuring precise time synchronization in space-based and high-altitude systems, but also has applications in terrestrial systems relying on high-precision synchronization between a plurality of components.

The information included in this Background section of the specification, including any references cited herein and any description or discussion thereof, is included for technical reference purposes only and is not to be regarded subject matter by which the scope of the invention as defined in the claims is to be bound.

SUMMARY

Embodiments of the present disclosure have been developed to address the deficits of existing technology discussed below. For example, existing solutions such as the use of a heterodyne mixer require significant time periods for estimating small frequency differences between high-frequency clock signals. Lengthy estimation time may make the frequency difference estimate outdated for use in high-precision position, navigation, and timing (PNT) applications, autonomous operation, cyber-/transmission-security, and survivability, and thus resulting in large inaccuracies in determining position. If the sampling time is reduced in such a system, the high relative error makes the heterodyne-based estimate unreliable.

To remedy this deficiency, embodiments of the present disclosure are capable of reliably determining frequency differences lower than 1 millihertz (1E-3 Hz) between clocks operating at tens of megahertz (1E+6 Hz) over a sampling time shorter than 6 seconds. This short sampling time makes the synchronization operation suitable for use in applications such as high-precision position, navigation, and timing.

Atomic clock sources, for example without limitation chip scale atomic clocks (CSACs), provide clock signals that are stable for long periods, making them preferred for specialized space application such as PNT, survivability, specialized scientific projects, and for autonomous operation. Exemplary CSACs' have a minimum Allan deviation that occurs over an interval on the order of 1000's seconds. Local tunable clocks, for example and without limitation disciplined crystal oscillators (DOs), such as an Oven-controlled Crystal Oscillator (OCXO) and the like, are provided as reference clocks for synchronizing satellite processing systems and constellations of cooperative satellites. The minimum Allan deviation of a DO typically occurs over an interval ranging in the 10's of seconds, where after clock drift begins to dominate clock stability. DOs are steered toward an ensemble average for the constellation using the CSAC as the long-term stable reference.

Embodiments of the present disclosure perform quadrature demodulation of the CSAC output ($S_{CSAC}$) using the DO output ($S_{DO}$) as the demodulation reference. In some embodiments a separate oscillator, coupled to a phase lock loop (PLL), synchronizes the analog-to-digital converters (ADCs) to reference signal. Real-to-IQ conversion of the digitized CSAC and DO signals is performed to generate in-phase and quadrature signals. The system and method of the present disclosure then performs complex multiplication (using physical devices or virtual equivalents) between the complex valued inputs to yield a complex valued signal whose frequency is the difference between the $S_{CSAC}$ and the $S_{DO}$ signals.

Other embodiments of the present disclosure are designed to eliminate the separate oscillator and phase locked loop, eliminate the ADC associated with the DO, use the $S_{DO}$ as the ADC and real-to-IQ converter clock, and eliminate a physical complex-valued mixer. In some embodiments, a "virtual" mixer is established by clocking a R2IQ converter (responsible for converting the CSAC signal to in-phase and quadrature components) at a multiple of the DO frequency and timing I/Q switching and inversion. This achieves the result of calculating a frequency offset between the CSAC and DO signals with high accuracy, but also simplifies the implementation from a SWaP-C (Size, Weight, Power, and Cost), design, and fabrication perspective.

This Summary is provided to introduce a selection of concepts in a simplified form that are further described below in the Detailed Description. This Summary is not intended to be used to limit the scope of the claimed subject matter. A more extensive presentation of features, details, utilities, and advantages of embodiments of the present invention is provided in the following written description and illustrated in the accompanying drawings.

BRIEF DESCRIPTION OF THE DRAWINGS

FIGS. 6A and 6B illustrate output signal plots of signal processing according to the present disclosure.

DETAILED DESCRIPTION

Figure 1:
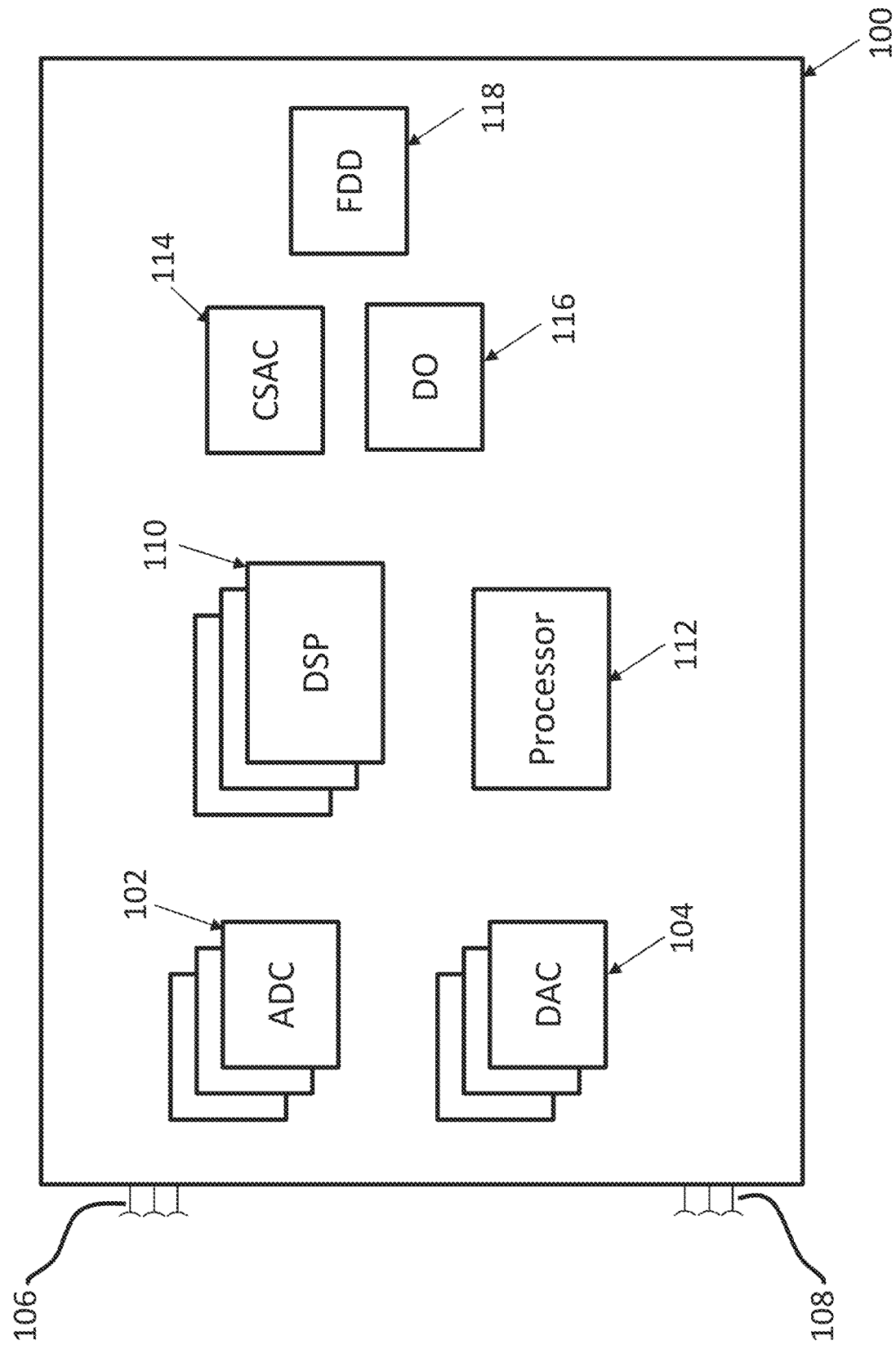
FIG. 1 depicts an exemplary payload block diagram for a system of the present disclosure.

In some examples, the present disclosure is directed at measuring and correcting for small frequency differences between two signals. In one example, the present disclosure is directed at measuring small frequency differences between similar signals, such as two sinusoidal signals. A preferred use is provided below with respect to synchronizing two or more clocks on and/or among a constellation of satellites (or other space-borne assets). Although discussed in the context of satellites and constellations of satellites, the present disclosure may have broader application including the synchronization of any two similar input or output signals, such as control signals or feedback signals between two electric motors or other systems on which precise synchronization of devices is required.

Satellites may be equipped with a long-term stable clock sources such as an atomic clock conforming to space qualified atomic frequency standards (AFS), which may have a lower drift rate and inherent insensitivity to radiation compared to conventional crystal oscillators (XOs), to provide a stable reference for local clocks. In some examples, the atomic clock is a chip scale atomic clock (CSAC). Other types of oscillators may be used in place of a CSAC, assuming the Allan deviation of such a clock is substantially lower than the tunable clock source being synchronized. In some examples, typical Allan deviation for CSAC is on the order of 1E-11 over a 10,000 second interval while that of a high-quality DO is 5E-13 at 10 seconds. The Allan deviation of the disciplined crystal oscillator (DO) increases rapidly to on the order of 3E-10 at 10,000 seconds. A tunable disciplined crystal oscillator may be provided to allow the local satellite clock reference to be steered toward the ensemble average for a constellation of cooperative satellites, while the CSAC provides the stable reference to counteract the naturally occurring time drift in crystal oscillators. In some examples, the disciplined crystal oscillator may be an oven-controlled crystal oscillator (OCXO). In other examples, tunable clock sources such as LC oscillators (e.g., Clapp or Colpitts oscillators), voltage-controlled oscillators (VCO), single distributed oscillators, master oscillator groups, and the like may be used. As will be described, the ensemble average calculation (e.g., clocks between satellite constellation assets) may take much longer than the detection and correction for local clock offsets (e.g., offset within a satellite or other on-orbit payload components) so that instabilities in the ensemble average are not introduced.

The present disclosure's various embodiments implement a quadrature-demodulation algorithm to determine small frequency differences between the CSAC and DO clock signals, and use this frequency difference to correct the tunable DO clock signal local to the satellite. The calculated frequency difference may also be used as a contribution to an ensemble clock average in a constellation of satellites. For example, the contribution may be generated by an ensemble clock calculating circuit provided on an individual satellite (e.g., satellite payload 100) based on a determined frequency difference, by means of a time stamp embedded in a two-way time transfer (TWTT) signal, or by similar representations of the frequency difference. In some embodiments, frequency differences smaller than 1 millihertz (1 mHz or 0.001 Hz) can be measured and corrected for between two signals operating in the 10's megahertz (MHz). The disclosed quadrature-demodulation operation operates on a complex-valued signal, and preserves the phase of the signal which provides information about which of the two signals, $S_{DO}$ and $S_{CSAC}$ for example, is at the higher or lower frequency. Thus, in contrast to existing solutions, the calculation of the frequency difference informs the magnitude and direction the tunable clock must be adjusted without the need for additional processing steps. The quadrature-demodulation is able to estimate frequency difference in a small-time interval (6 seconds or less) while arriving at a very accurate estimate (relative errors between true frequency difference and calculated frequency difference of less than 1%). Furthermore, in the example of two similar signals such as single-tone sine waves, there is no need for fast Fourier transformation (FFT) processing, which in this application would be quite inefficient. For example, assuming a difference frequency range of ±1 Hz, an FFT on the order of 2,000 samples in length would be required. By removing the need for an FFT, complexity and size, weight, and power (SWaP) considerations are greatly improved.

Embodiments of the present disclosure will now be discussed with reference to the various Figures.

FIG. 1 illustrates a simplified satellite 100 payload having, among other things, one or more analog-to-digital converters (ADCs) 102, one or more digital-to-analog converters (DACs) 104, one or more digital signal processing pipelines (DSPs) 110, one or more processors 112, a clock source with long-term stability 114 such as a chip-scale atomic clock (CSAC), a tunable clock source 116 such as a disciplined crystal oscillator (DO), and a frequency difference detector (FDD) 118 module for determining the frequency difference between the DO 116 and CSAC 114. The satellite payload 100 may have transmit and receive antenna 106, 108 (or optical transceivers) for communicating between the satellite and the ground, and/or for communicating between satellites within a constellation of other satellites 100. Signal inputs and outputs (not illustrated), serializer and deserializers (SerDes) (not illustrated), and other component interconnections (not illustrated) electrically couple the components of the payload 100 in a conventional manner. As discussed below, one or more components of the satellite payload 100 may be designed or fabricated to be radiation tolerant. In some examples, this may include selection of specific materials which perform better in space and high-altitude radiation environments, and/or may comprise specific semiconductor fabrication, processing, and treatment steps. Individual components may be provided with radiation detection and mitigation functionality, or radiation effect detection and mitigation algorithms may be implemented in the payload at the system-level to mitigate and recover from any radiation impact to the satellite components.

The processor(s) 112 may include one or more processing cores and be formed as application specific integrated circuits (ASIC), structured ASICs, field programmable gate arrays (FPGA), general purpose processors, central processing units (CPUs), graphics processing units (GPU), and the like, and they may be provided on one or more die in a semiconductor package or may be spread over multiple packages. Various components, including DSP cores 110, processor(s) 112, ADCs 102, DACs 104, and/or FDD 118, may have a feature size between 3 nm-180 nm, includes for example 3 nm, 5 nm, 7 nm, 12 nm, 14 nm, 22 nm, 28 nm, 32 nm, 45 nm, 65 nm, 90 nm, or a combination of feature sizes within a semiconductor package. In some embodiments, more than one component of the satellite payload 100 is integrated together on one or more die in a semiconductor package. For example, ADC 102, DAC 104, DSP 110, Processor 112, clock source 114, tunable clock source 116, and/or FDD 118 may be integrated together on one or more die in a semiconductor package. Transmit antenna 106 and receive antenna 108 may be provided as a phased array (PA), direct radiating array (DRA), parabolic reflectors, optical (e.g., laser) links, and the like. A combination of both optical and RF transceivers may also be provided. All or some of these components may be utilized in the implementation of the frequency differencing algorithm described herein.

Figure 2:
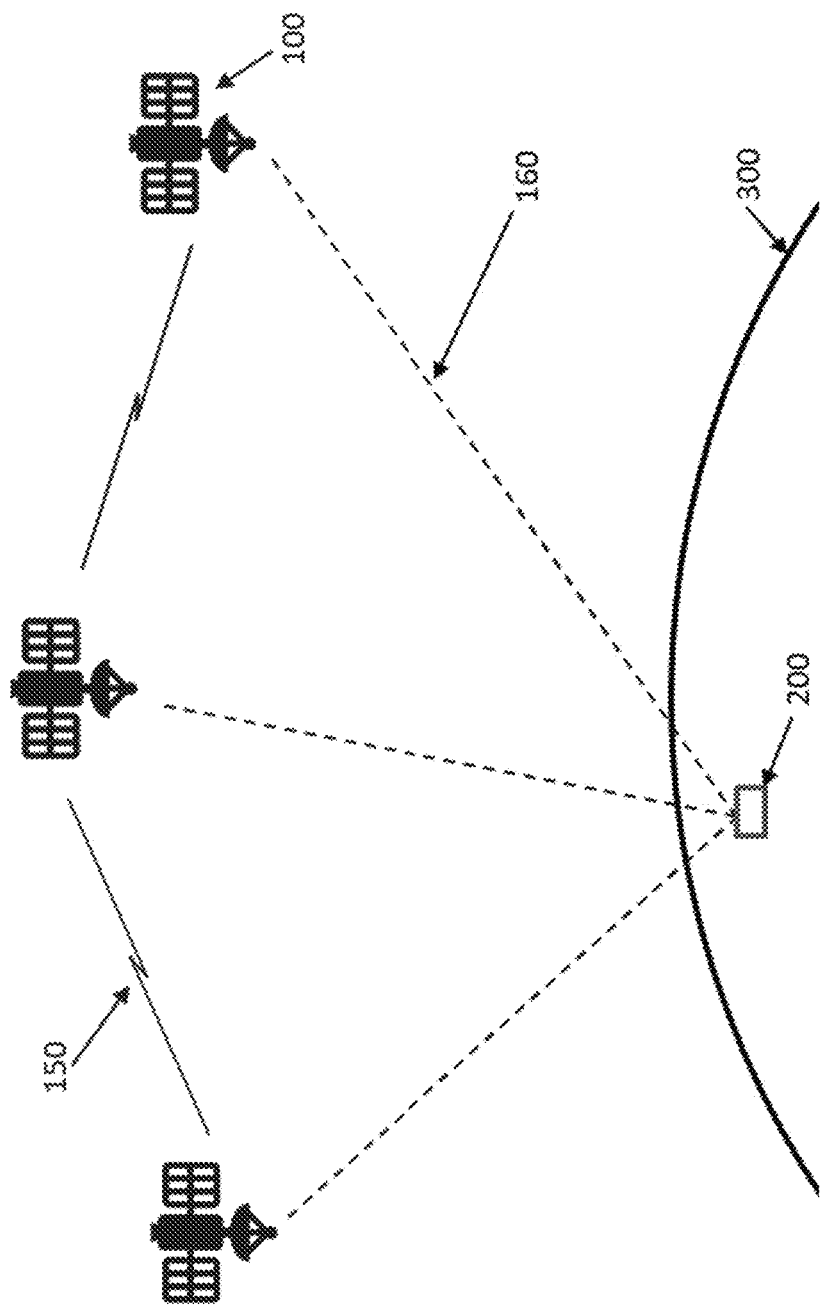
FIG. 2 illustrates an exemplary system utilizing the method of the present disclosure.

FIG. 2 illustrates a plurality of satellites 100 in orbit around the Earth 300 or other celestial object (e.g., a planetary moon, asteroid, and the like). Inter-satellite communication links 150, which may be of the same or different type as the transmit antenna 106 and receive antenna 108, facilitate transmission of information between satellites 100 in a constellation. Terrestrial communication links 160, which may be of the same or different type as the transmit antenna 106, receive antenna 108, and inter-satellite communication links 150, facilitate communication between satellites 100 in a constellation and terrestrial assets 200. In some examples terrestrial assets 200 may be assets such as, but without limitation, mobile assets including persons, automobiles, aircraft, watercraft, balloons, and the like. In other examples terrestrial assets 200 may be stationary assets such as satellite gateways, antenna arrays, buildings, residences, and the like. A terrestrial asset 200 may also provide a "true time" by which the constellation or individual satellites 100 may use for fine calibration of local and ensemble time averages. Although discussed in the context of a constellation of satellites, the satellites 100 may be provided as solitary orbital assets (i.e., not part of a constellation) without departing from the scope of the present disclosure. In such an implementation, inter-satellite communication links 150 may be selectively omitted.

The satellites 100 need to be time synchronized in order to share a common understanding of the current time to a high degree of precision. Communication links 150 are used to share each satellite's local estimate with its nearest neighbors in the constellation of satellites 100. A two-way-time-transfer (TWTT) protocol such as defined by, but not limited to, IEEE1588 (incorporated herein by reference) allows each satellite payload 100 to estimate the relative time difference between itself and its neighbors in order to drive the difference toward zero. TWTT may be needed in instances where separate nodes do not have direct access to a common time-base, such as with satellites in a GPS-denied or corrupted environment. Over time, using an optimal estimation technique such as Kalman filtering, an ensemble clock for the constellation can be maintained. The present disclosure describes a system which more quickly and accurately achieves on-satellite synchronization, and the TWTT is therefore also more accurate with an ensemble average more efficiently achieved. In some examples, another process may be used to correct for any offsets between the constellation ensemble average time and an absolute time as determined by a terrestrial master oscillator at a ground station (e.g., terrestrial asset 200) using the terrestrial communication links 160. The term "terrestrial" in the context of this disclosure may refer to celestial bodies other than the Earth, such as but not limited to the Moon, Mars, Venus, asteroids, and the like.

Figure 3:
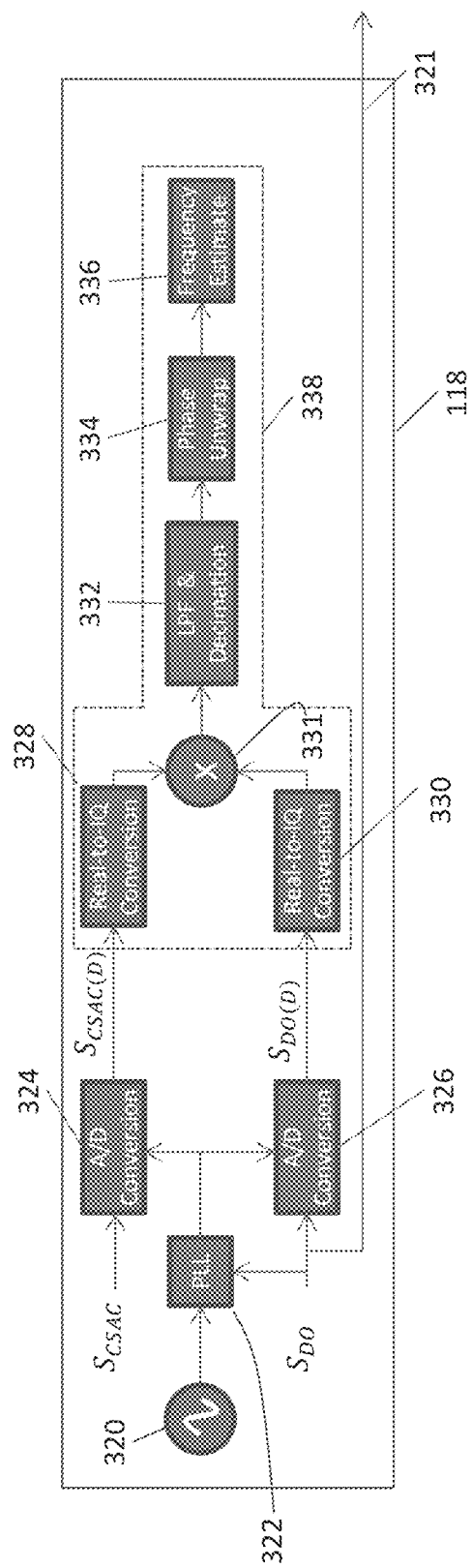
FIG. 3 is a functional block diagram of an example of the present disclosure.

With reference now to FIG. 3, an embodiment of the frequency difference detection method and related modules will be discussed. Although the frequency difference detector FDD 118 (see FIG. 1) is illustrated as a single module for carrying out the frequency difference detection method, it should be noted that the frequency difference detection method may be achieved by one or more dedicated modules, or by module(s) implemented into other satellite 100 payload components such as DSP 110, processor 112 (ASIC, structured ASIC, FPGA, CPU, GPU), and the like.

The functional steps performed by FDD 118 are representative of the complete frequency difference detection algorithm discussed below. An auxiliary oscillator 320 operating at a frequency that meets the Nyquist criteria for $S_{DO}$ and $S_{CSAC}$ provides the clock for the analog to digital conversions by ADC 324 and ADC 326. The auxiliary oscillator 320 output is synchronized to $S_{DO}$ using a phase locked loop (PLL) circuit 322. $S_{DO}$ may be used as a clock for other circuitry in the satellite 100 payload as represented by signal line 321 in FIG. 3. The signals output by the real-to-IQ (R2IQ) converters 328 and 330 are complex valued representations of the output of ADC 324 and ADC 326. Complex mixer 331 circuitry performs a complex-by-complex multiplication between the signals output by R2IQ converter 328 and R2IQ converter 330. Steps performed to complete the frequency differencing algorithm are performed by the frequency difference estimation module 338, which in some examples may include the R2IQ converters 328 and 330 and complex mixer 331. In other examples, the R2IQ converters 328 and 330 and complex mixer 331 may be provided as individual components separate from the frequency difference estimation (FDE) module 338. The output of complex mixer 331 may be filtered by a low-pass filter 332. Data rate reduction may be performed by low-pass filter 332, which may take the form of decimation of the signals output by the complex mixer 331. The phase of the signal output by low-pass filter 332 is extracted by phase unwrapper 334. The phase unwrapper 334 circuit removes a modulo 2π phase jump that may be introduced. The slope of the signal output by phase unwrapper 334 is extracted and both the sign and the magnitude are retained by frequency difference estimation circuit 336. The magnitude of the slope of the unwrapped phase signal is the frequency difference between the CSAC and DO signals, while the sign informs the direction of the required offset to correct for this frequency difference. Accordingly, no additional processing is necessary to determine magnitude of the frequency difference as well as determine which clock is at a higher or lower frequency.

The FDD 118 is configured to perform quadrature demodulation of the chip-scale atomic clock (CSAC) output ($S_{CSAC}$) using the disciplined crystal oscillator DO output ($S_{DO}$) as the reference. The CSAC signal $S_{CSAC}$ is provided to ADC 324 while the DO signal $S_{DO}$ is provided to ADC 326. ADC 324 converts $S_{CSAC}$ to a digital representation $S_{CSAC(D)}$ and ADC 326 converts $S_{DO}$ to a digital representation $S_{DO(D)}$. An auxiliary oscillator 320 signal and the $S_{DO}$ signal are provided as inputs to a phase locked loop (PLL) 322, whose output is provided as a sampling frequency ($f_S$) for the ADCs 324 and 326. The PLL 322 ensures that the auxiliary oscillator 320 is synchronized with the signal $S_{DO}$. Digital representations of the DO and CSAC signals, $S_{DO(D)}$ and $S_{CSAC(D)}$, are converted to in-phase and quadrature components by Real-to-IQ converters 328 and 330 respectively. Real-to-IQ (R2IQ) converters 328 and 330 may include a low-pass filters to remove the undesirable sum frequency resulting from the R2IQ process.

After conversion to IQ components, the DO and CSAC signals are provided to a complex mixer 331 (i.e., not real-valued) which generates a complex valued signal with just the difference frequencies between $S_{CSAC}$ and $S_{DO}$ (rather than both sum and difference frequencies in the case of a real-valued mixer). In one example, the $S_{DO}$ signal is chosen as the reference signal and the $S_{CSAC}$ signal is chosen as the unknown signal. This choice is simply a chosen convention, and the $S_{CSAC}$ can be chosen as the reference and $S_{DO}$ as the unknown without departing from the scope of the present disclosure.

In some examples, decimation of greater than 100,000:1 is performed, commensurate with the significantly reduced signal bandwidth after the complex multiply performed by the mixer 331. The decimation ratio may be chosen to minimize the number of samples that are retained while still respecting the Nyquist criteria with sufficient over-sampling margin. In the non-limiting example of a 10 MHz CSAC signal, the bandwidth at this point in the signal processing is a few millihertz compared to supportable band of 10 MHz, which allows the decimation to be performed by just saving every $n^{th}$ sample and discarding the rest. In other implementations, explicit decimation by conventional methods may be necessary, and may be included in the filter characteristics of the LPF and decimation module 332. In some examples, decimation of less than or greater than 100,000:1 may be performed and the decimation level may be chosen based on the frequency of $S_{CSAC}$, $S_{DO}$, or the processing bandwidth of individual components in the FDD signal processing chain.

After mixing of the $S_{CSAC}$ and $S_{DO}$ signals in the complex mixer 331, the mixed signal is presented to a low-pass filter 332 to provide noise filtering. In some examples the low-pass filter 332 may be a third-order low pass filter 332 with a frequency response cutoff of 0.1 Hz. The resulting noise-filtered signal may be phase-unwrapped by unwrapper 334, and the derivative of the unwrapped signal is determined by a derivative function in the frequency estimation circuit 336. The derivative of the resultant signal's phase, with appropriate scaling is the frequency difference between CSAC and the DO. Frequency estimation circuit 336 also scales the derivative signal by $2\pi$ (e.g., divides the signal by $2\pi$) and the result is the difference frequency between $S_{CSAC}$ and $S_{DO}$. The division by $2\pi$ converts the units of the signal from radians per second to cycles per second which is frequency. In some examples, the use of a linear least-squares estimator such that the slope $$m = \frac{N\Sigma(x_i y_i) - \Sigma x_i \Sigma y_i}{N\Sigma x_i^2 - (\Sigma x_i)^2},$$

where $x_i$ and $y_i$ are the time and phase sample points, respectively, while N is the number of samples, will directly yield the frequency and indicates, by the sign of the slope m, which of the two signals is at the higher frequency (after scaling by $2\pi$). It is noted that in some instances, phase unwrapper 334 may not be included, further simplifying the circuit design. For example, if the phase offset does not exceed $+/-\pi$, then phase unwrapping may not be necessary.

Although described as being performed by separate components 332, 334, and 336, all or portions of the low-pass filtering, decimation, phase unwrap, derivative calculation, and slope estimation processing may be performed by a frequency difference estimation module 338 (e.g., a general-purpose processor, central processing unit, ASIC, structured ASIC, FPGA, and the like) without departing from the scope of the present disclosure.

As discussed above, with the $S_{CSAC}$ as the unknown signal and $S_{DO}$ as the reference signal, a negative slope estimation indicates that $f_{DO} > f_{CSAC}$ while a positive slope indicates the opposite condition (where f is frequency of the respective signals). If the $S_{CSAC}$ signal were chosen as the reference and $S_{DO}$ were chosen as the unknown, a positive slope estimation indicates that $f_{CSAC} > f_{DO}$ while a negative slope indicates the opposite condition. That is, the complex demodulation preserves information about which of $S_{CSAC}$ and $S_{DO}$ is at the higher and lower frequencies in the sign of the slope, which simplifies processing complexity. Accordingly, the $S_{DO}$ clock signal can be tuned (e.g., by a frequency control circuit such as portions of the circuit of FIG. 5) to match $S_{CSAC}$ or to be at a known offset (e.g., by a fractional value or multiple of the frequency offset or frequency difference) with respect to the frequency of $S_{CSAC}$.

Figure 4:
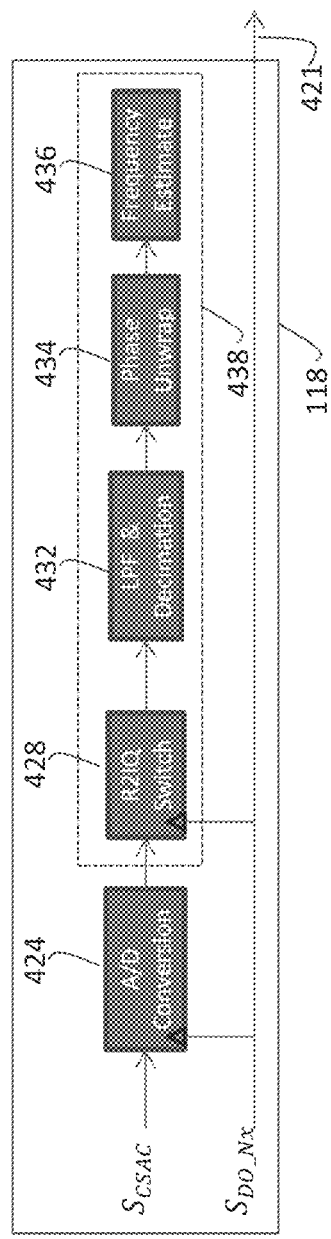
FIG. 4 is a functional block diagram of another example of the present disclosure.

FIG. 4 illustrates another embodiment of the frequency difference detector (FDD) 118. In the example of FIG. 4, the FDD 118a is configured to perform quadrature demodulation of the chip-scale atomic clock CSAC output ($S_{CSAC}$) using the disciplined crystal oscillator DO output ($S_{DO}$) as the reference. In this implementation, the $S_{DO}$ signal is configured to be between 2.2× and 10× the frequency of the $S_{CSAC}$ signal, or 1.1×-5× the nominal Nyquist frequency of the CSAC signal. In some examples the $S_{DO}$ signal, used as the sampling rate for the R2IQ switch and ADC, may be a multiple N of 1.1, 1.5, 1.7, 2, 2.5, 3, 3.5, 4, 4.5, or 5 times the Nyquist frequency of the CSAC (i.e., 2.2×, 3×, 3.4×, 4×, 5×, 6×, 7×, 8×, 9×, or 10× the frequency $f_{CSAC}$ of the $S_{CSAC}$ signal). In some implementations, the roles of $S_{CSAC}$ and $S_{DO}$ may be reversed in which case a negative slope would indicate that $S_{CSAC}$ is at the higher of the two frequencies. In some implementations, the sampling frequency $f_S$ may enable the real-to-IQ conversion and baseband demodulation performed in the R2IQ switch 428 can be performed as a single step.

An analog to digital converter (ADC) 424 digitizes the signal $S_{CSAC}$. A clock signal $S_{DO\_Nx}$ is provided to ADC 424 at a frequency that is a multiple N of the Nyquist frequency of signal $S_{CSAC}$. Accordingly, since the $S_{CSAC}$ and $S_{DO}$ signals are expected to have frequencies that are similar or close to each another, $S_{DO\_Nx}$ may in some examples also represent a frequency that is a multiple N of the Nyquist frequency of $S_{DO}$. As discussed above, N may be a number in the range between 1.1 and 5 (e.g., N may be chosen to equal 1.1, 1.5, 1.7, 2, 2.5, 3, 3.5, 4, 4.5, or 5). The R2IQ switch 428 circuit, which performs the real-to-IQ conversion, is also clocked by $S_{DO\_Nx}$. The signal $S_{DO\_Nx}$ may be used by other circuitry in the satellite 100 payload, as represented by signal line 421. The low-pass filter (LPF) and decimation circuit 432 performs a low-pass filter operation to remove the unwanted frequency image on the signal output by R2IQ switch 428. The LPF and decimation circuit 432 may in some examples also reduce the sample rate of the data stream output by R2IQ switch 428. The phase of the signal output by LPF circuit 432 is extracted by phase unwrapper 434. The phase may be unwrapped to remove a modulo $2\pi$ phase jump that may have been introduced into the signal output by the R2IQ switch 428 and/or the LPF and decimation circuit 432. The slope of the signal output by phase unwrapper 434 (e.g., a derivative of the unwrapped phase) is calculated and both the sign and the magnitude are retained by a derivative function in the frequency estimation circuit 436. With appropriate scaling, this output is the frequency difference between CSAC and the DO. Frequency estimation circuit 436 scales the derivative signal by $2\pi$ (e.g., divides the signal by $2\pi$) and the result is the difference frequency between $S_{CSAC}$ and $S_{DO}$.

In some implementations, where the sampling frequency $f_s$ is derived from $f_{DO\_2x}$ (that is, N=2 or the sampling frequency is four times the frequency of the DO), the explicit complex mixer multiplication operation, $S_{CSAC} \cdot S_{DO}$, can be eliminated. This may eliminate the complex multiplication operation which consists of four real-valued multipliers and two real-valued adders, and accordingly in this discussion this is referred to as "virtual mixing." The virtual mixer, performed by "R2IQ" switch 428, may comprise a 1:2 demultiplexer, sign inversion logic, and timing circuit (e.g., a two-bit counter). The result of this operation is a signal that is demodulated to the difference between $S_{CSAC}$ and $S_{DO}$. For example, quadrature demodulation by $f_s/4$ corresponds to multiplication by $$e^{jn\frac{\pi}{2}},$$

Euler notation corresponding to $$\cos\left(\frac{\pi}{2}n\right) + j\sin\left(\frac{\pi}{2}n\right)$$

where $j=\sqrt{-1}$. For n=[0, 1, 2, 3, ... ] the previous equation simplifies to [1, j, −1, −j]. The multiplication by j is a rotation onto the imaginary axis (or quadrature channel) so the implementation of this virtual multiplication is performed by switching consecutive digitized samples onto either the In-phase (I) or Quadrature (Q) channel, with or without an accompanying negation.

This demodulation is implemented with an appropriately sequenced switch and sign change, which is performed by the R2IQ switch 428. For example, a first sample of the $S_{CSAC}$ may be converted to its in-phase (I) component, the second sample into a quadrature (Q) component, the third sample into a −I component, and the fourth sample into a −Q component. This sequencing of switching is then repeated. Since the frequency of $S_{CSAC}$ is approximately or, in some examples, exactly one quarter of the sampling rate (i.e., fs/4), $S_{CSAC}$ is demodulated to the difference frequency between $S_{CSAC}$ and $S_{DO}$.

The demodulation of $S_{CSAC}$ results in a value within a few millihertz (mHz) of DC with an undesirable image within a few millihertz of $\pm f_s/2$ (half the sampling frequency). A narrow-band lowpass filter 432, which may be similar to the LPF discussed above with respect to FIG. 3, eliminates the images at $\pm f_s/2$ introduced by processing or previously present in the DO or CSAC signals. In one example, the lowpass filter 432 can be a simple low order filter such as a third order LPF with a frequency response cutoff of, for example, 0.1 Hz.

With continued reference to FIG. 4, and similar to processing described above with respect to FIG. 3, the output of the R2IQ switch 428 is decimated and noise is filtered out by the low-pass filter and decimation module 432. In operation, significant decimation (in some examples greater than 100,000:1) is performed, commensurate with the significantly reduced signal bandwidth after the complex multiply performed by the virtual mixer (e.g., the R2IQ switch 428). In the non-limiting example of a 10 MHz CSAC signal, the bandwidth at this point is a few millihertz compared to supportable band of 10 MHz, which allows the decimation to be performed by just saving every $n^{th}$ sample and discarding the rest. In other implementations, explicit decimation by conventional methods may be necessary, and may be included in the filter characteristics of the LPF and decimation module 432. Decimation of less than or greater than 100,000:1 may be performed and the decimation level may be chosen based on the frequency of $S_{CSAC}$, $S_{DO}$, or the processing bandwidth of individual components in the FDD signal processing chain. After $S_{CSAC}$ and $S_{DO}$ signals are virtually mixed, low-pass filtered 432 operates to reduce unwanted noise and signal images as discussed above. The resulting noise-filtered signal's phase is unwrapped by unwrapper 434, and the derivative of the unwrapped signal is determined by a frequency estimation circuit 436. The derivative of the resultant signal's phase, with appropriate scaling, is the frequency difference between CSAC and the DO. Frequency estimation circuit 436 scales the derivative signal by $2\pi$ (e.g., divides the signal by $2\pi$) and the result is the difference frequency between $S_{CSAC}$ and $S_{DO}$.

Similar to the discussion in FIG. 3, although described as being performed by separate components 428, 432, 434, and 436 in the example of FIG. 4, all or portions of the low-pass filtering, decimation, phase unwrap, derivative calculation, and slope estimation processing may be performed by a frequency difference estimation (FDE) module 438 (e.g., a signal processor, a general purpose processor, CPU, graphics processing unit (GPU), ASIC, structured ASIC, FPGA, and the like) without departing from the scope of the present disclosure.

As discussed above, with the $S_{CSAC}$ as the unknown signal and $S_{DO}$ as the reference signal, a negative slope estimate indicates that $f_{DO} > f_{CSAC}$ with $f_{DO}$ and $f_{CSAC}$ being the frequencies of the respective signals $S_{DO}$ and $S_{CSAC}$. A positive slope indicates the opposite condition. If on the other hand, the $S_{CSAC}$ signal were chosen as the reference and $S_{DO}$ were chosen as the unknown, a negative slope estimation indicates that $f_{CSAC} > f_{DO}$ while a positive slope indicates the opposite condition. Accordingly, the $S_{DO}$ clock signal can be tuned accordingly (e.g., by a frequency control circuit such as portions of the circuit of FIG. 5) to match $S_{CSAC}$ or to be at a known offset (e.g., by a fractional value of the frequency offset or frequency difference) with respect to the frequency of $S_{CSAC}$. In either scenario, complex demodulation preserves information which allows the higher and lower of $S_{CSAC}$ and $S_{DO}$ frequencies to be determined from the sign of the slope, which reduces processing complexity. Further, by eliminating the explicit complex multiplication operation consisting of four real-valued multipliers and two real-valued adders, size, weight, power, and cost (SWaP-C) is improved significantly.

For example, a typical complex digital demodulator consists of four digital multipliers and two digital adders which corresponds to roughly 8,000 two input equivalent gates. If radiation mitigation and/or radiation tolerance logic is included, the size may expand to 24,000 equivalent gates. In the present disclosure, a complex digital demodulator, using a 1:2 switch (e.g., the R2IQ switch 428), comprises two sets of registers and a two-bit counter. The two-bit counter is configured to generate the repeating binary sequence [b'00, b'01, b'10, b'11] needed to demultiplex the real valued stream into In-phase and Quadrature channels with alternating sign conversion as described above. By comparison with typical complex digital modulators described above, this enables an implementation of an R2IQ switch 428 which including radiation hardening, radiation tolerance, and/or radiation mitigation logic, this circuit corresponds to roughly 1,000 equivalent gates or a 24:1 reduction in circuitry size and complexity just for the demodulation function (i.e., 24:1 when compared with 24,000 equivalent gates of typical complex digital demodulators). In addition to this approximate 24:1 reduction in circuit size and complexity, even greater size weight, power and cost (SWaP-C) benefits are realized by this implementation of an R2IQ switch 428 and the algorithm discussed above by virtue of the elimination of a separate oscillator (e.g., auxiliary oscillator 320 in FIG. 3) and phase-locked loop PLL (e.g., PLL 322 in FIG. 3) as discussed above with respect to FIG. 4. Additionally, in the example of FIG. 4, by eliminating the need for a physical mixer, there is a reduction in the amount of noise introduced by the R2IQ signal processing.

Figure 5:
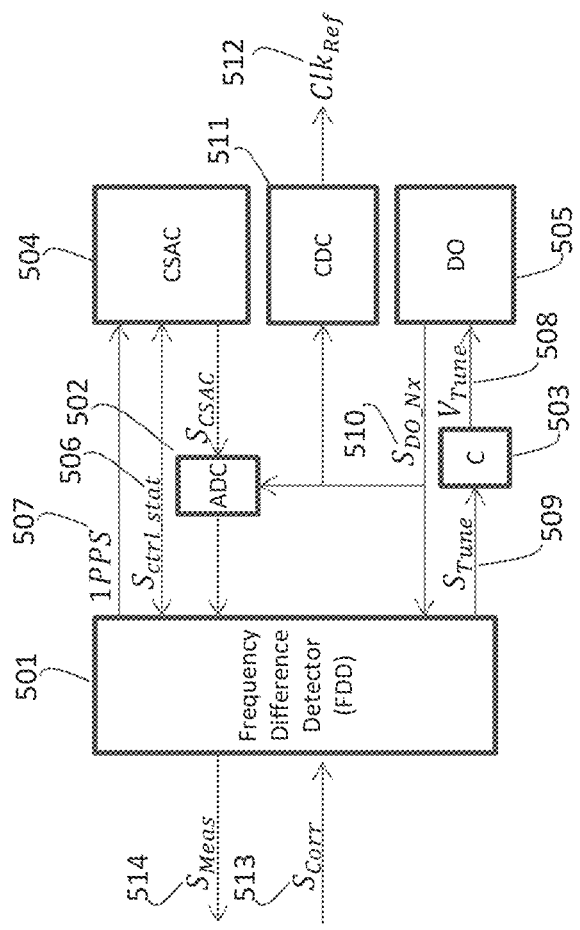
FIG. 5 illustrates an exemplary circuit block diagram the system in FIGS. 3 and 4.

FIG. 5 illustrates exemplary connections between circuits in the Frequency Difference Detector components 501 and the clock sources, chip-scale atomic clock (CSAC) 504 and disciplined crystal oscillator (DO) 505, which generate signals $S_{DO}$ and $S_{CSAC}$ in FIGS. 3 and 4 as well as an receives correction signal $S_{corr}$ 513 and an transmits measurement signal $M_{Meas}$ 514. FIG. 5 illustrates frequency control paths, which may be circuit traces, parallel circuit interconnections, SerDes traces, and the like, which allow the frequency of the DO 505 (or other tunable clock source) to be tuned and controlled in response to a detected frequency difference between two or more clock sources. In some examples, the FDD 501 may include the components of the frequency difference estimation module 338 or 438 as discussed above with respect to FIGS. 3 and 4. As described in FIG. 4, $S_{CSAC}$ is digitized by analog-to-digital converter (ADC) 502, the output of which is passed to the R2IQ switch 428 (see FIG. 4). $S_{DO\_4x}$ is used as the sampling clock for the ADC 502 and is also provided to the FDD 501. The signal $S_{DO\_Nx}$ 510 may be used by other circuitry in the satellite 100 payload, for example as a clock signal represented by the signal $Clk_{Ref}$ 512. In some embodiments $Clk_{Ref}$ 512 may be a modified version of $S_{DO\_4x}$ 510 by clock distribution circuit (CDC) 511 to create multiple copies, change phase and frequency, change impedance characteristics, and change output level characteristics. In some embodiments the frequency of the CSAC 504 may be adjustable using a digital or analog control $S_{ctrl\_stat}$ 506. A digital implementation may implement a Universal Asynchronous Transmitter/Receiver (UART) using an electrical standard such as RS-232, RS-422, RS-485, serial peripheral interface (SPI), and the like. In some embodiments especially where a UART provides the interface, $S_{ctrl\_stat}$ 506 may be a bidirectional signal which returns status regarding the health and performance of the CSAC 504. The DO 505, is steered using a control voltage $V_{tune}$ 508. In some embodiments $V_{tune}$ 508 is derived from a multiple-bit digital signal $S_{tune}$ 509 generated by FDD 501, in which case circuit 503 is an analog signal formed by a digital-to-analog converter (DAC). In some embodiments $V_{tune}$ 508 is derived from a pulse width modulated (PWM) signal $S_{tune}$ in which case the circuit 503 is a combined active or passive low-pass filter and isolation amplifier circuit (not shown). In some embodiments $V_{tune}$ 508 is a digital word where the word length may vary from 8-bits to 16-bits or more. In some embodiments signal $S_{Corr}$ 513 may be an analog or digital input from a CPU, GPU, ASIC, structured ASIC, FPGA, DSP or similar processing device that supplies a correction value that is used to derive signal $S_{tune}$ 509. In some embodiments signal $S_{Meas}$ 514 may be a representation of the measured difference signal as determined by FDD 501 that is supplied to a CPU, GPU, ASIC, structured ASIC, FPGA, DSP or similar processing device to support computations or as a status indication.

FIG. 6 illustrates the examples of signal processing outputs described in the embodiments of FIGS. 3 and 4. A low noise case is shown for clarity, however, even with noise levels of 11 dB (or greater) the frequency difference detection algorithm is able to calculate frequency differences lower than 1 mHz in less than 6 seconds and with relative errors lower than 1%.

FIG. 6A shows the case where the frequency difference is −0.001 Hz meaning that $S_{DO}$ is at the higher frequency when $S_{DO}$ is used as the reference. FIG. 6B shows the case where the frequency difference is +0.001 Hz meaning that $S_{DO}$ is at the lower of the two frequencies. Curves 602 and 612 show the results after low pass filtering and decimation by LPF module 432. Curves 604 and 614 show the least-squares estimate of the curves 602 and 612. Curves 606 and 616 are scaled versions of the slope estimated in 434 and represents the value of the difference frequency. The magnitude of the slope of curves 606 and 616 indicate the absolute value of the frequency difference. The sign of the slope of 606 and 616 indicate which of $S_{CSAC}$ and $S_{DO}$ is at the higher and lower frequency.

In FIG. 6A, line 602 represents the unwrapped instantaneous phase output of the mixer 331 (or, as discussed above with respect to FIG. 4, the output of the R2IQ switch 428, which acts as a virtual mixer, and after processing by the LPF 432 and phase unwrapper 434). Line 604 is a linear least-squares fit of the unwrapped instantaneous phase 602, and when scaled by $2\pi$ as discussed above the result is a slope estimation curve 606. The slope of curve 606 labeled "Estimated Phase" represents the frequency difference between the DO and CSAC signals. In this convention, as discussed above, the sign of the slope informs us which signal is greater than the other. In the example of FIG. 6A and as discussed above with respect to FIGS. 3 and 4, since DO has been chosen as the reference signal for the real mixer (FIG. 3) or virtual mixer (FIG. 4), a positive slope on the slope estimation curve 606 signifies that the frequency of $S_{DO}$ is less than the frequency $S_{CSAC}$. Thus, the $S_{DO}$ clock signal can be tuned accordingly (e.g., by a frequency control circuit such as the circuit of FIG. 5) to match $S_{CSAC}$ by increasing the frequency of $S_{DO}$ by an amount corresponding to the estimated slope calculated by slope estimation curve 606 or to be at a known offset from $S_{CSAC}$.

Similarly, FIG. 6B illustrates instantaneous phase line 612 represents the instantaneous phase output of the mixer 331 (or, as discussed above with respect to FIG. 4, the output of the R2IQ switch 428, which acts as a virtual mixer). Line 614 is a linear least-squares fit of the unwrapped instantaneous phase 612. When scaled by $2\pi$, as discussed above, the slope coefficient m of 616 is the frequency difference between the DO and CSAC signals. In this convention, as discussed above, the sign of the slope indicates which signal is greater than the other. In the examples shown in FIGS. 6A and 6B and as discussed above with respect to FIGS. 3 and 4, since DO has been chosen as the reference signal for the real mixer (FIG. 3) or virtual mixer (FIG. 4), a negative slope on curve 616 labeled "Estimated Phase" signifies that the frequency of $S_{DO}$ is greater than the frequency $S_{CSAC}$. The $S_{DO}$ clock signal can be tuned accordingly (e.g., by a frequency control circuit such as the circuit of FIG. 5) to match $S_{CSAC}$ by decreasing the frequency of $S_{DO}$ by an amount corresponding to the estimated slope calculated by slope estimation curve 616 or to be at a known offset from $S_{CSAC}$.

As shown in titles of FIGS. 6A and 6B, the relative error of the estimated slope is less than $\frac{1}{10}^{th}$ of a percent. This slope estimate, which is actually the frequency difference detected between $S_{DO}$ and $S_{CSAC}$, is performed over a sampling interval of 3 seconds in this example. The low relative error between actual and calculated frequency difference, coupled with a very short sampling interval, provides a vast improvement in measuring small frequency differences between two high-frequency clock signals. This allows for more accurate clock synchronization between the chip scale atomic clock (CSAC) 114, 504 and the disciplined crystal oscillator (DO) 116, 505. When provided on satellites in a cooperative constellation of satellites (such as illustrated in FIG. 2), this enables a more accurate and updated ensemble clock average for the constellation thus improving the accuracy of position, navigation, and timing provided local to the constellation constituents (e.g., satellites 100) as well as end-users (e.g., terrestrial assets 200). Two-way time transfer (TWTT) with other satellites 100 may take place using, for example, inter-satellite communication links 150 and providing Kalman filtering to determine an optimal estimate for the ensemble clock average correction in a conventional manner. Inter-satellite communication links 150 may in some examples be optical links, RF links, or a combination of optical and RF links. The ensemble clock calculating circuit may alternatively or additionally be provided to a terrestrial or airborne asset, such as a human, satellite gateway, airplane, drone, balloon, and the like.

Figure 7B:
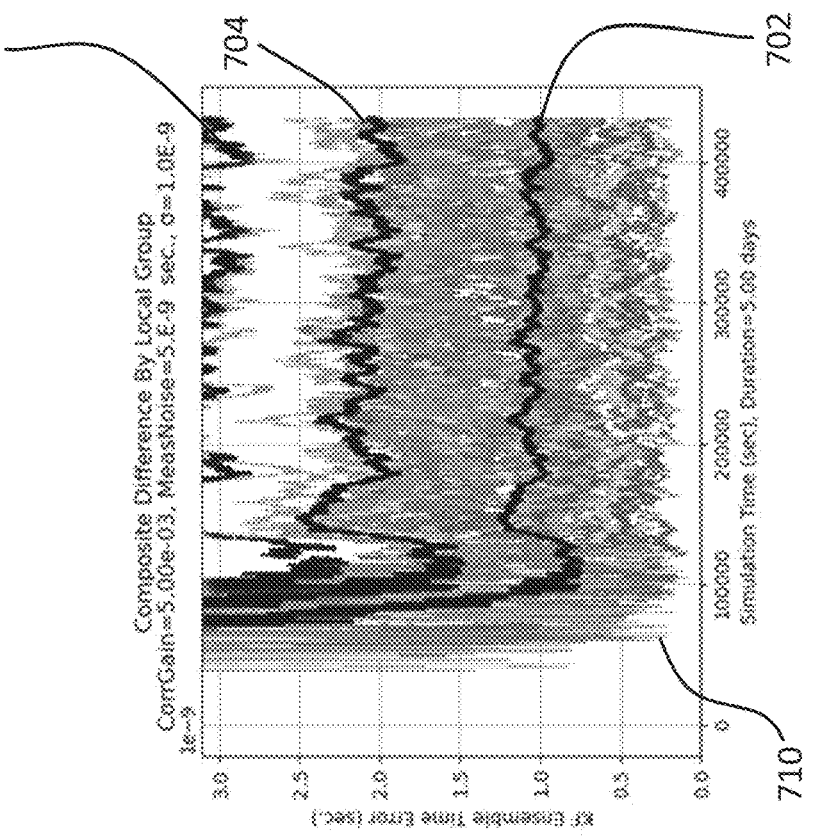
FIGS. 7A and 7B illustrate resulting time offset errors between clocks on an exemplary constellation of cooperative satellites for the composite constellation time (FIG. 7A) and for each Local Group (FIG. 7B) within the constellation.
Figure 7A:
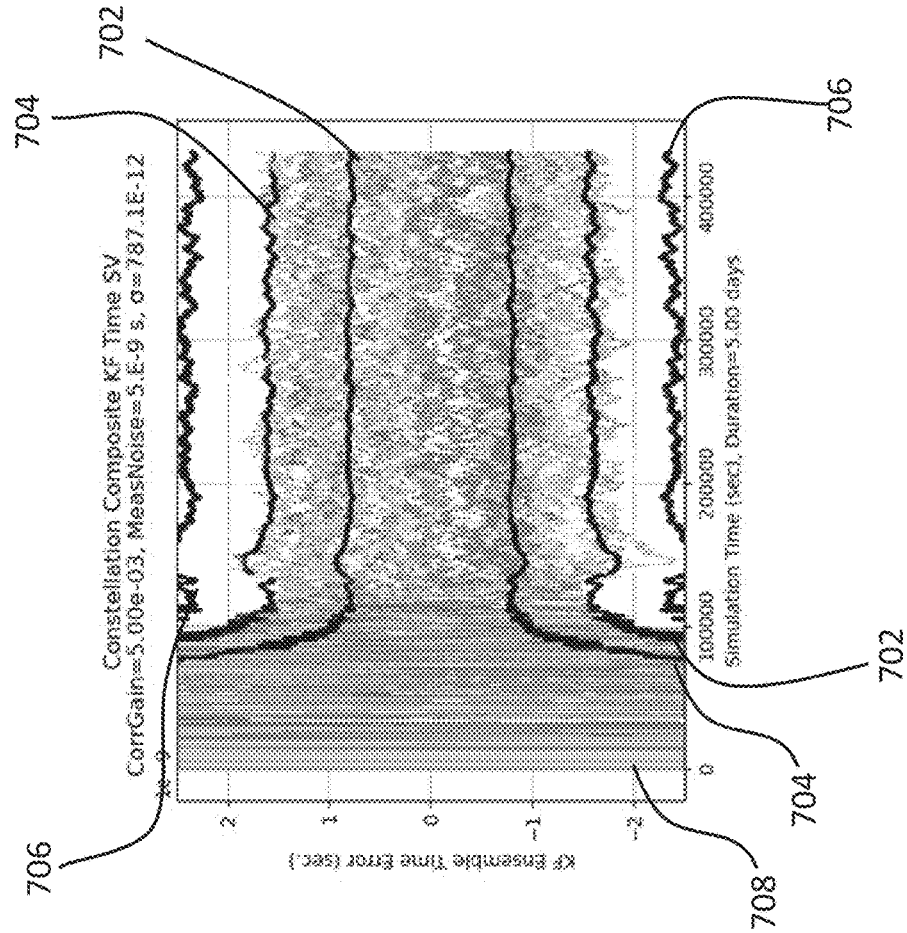

FIGS. 7A and 7B illustrate resulting time offset errors between clocks in a constellation of 100 satellites in 10 planes of 10 satellites (100) each after application of an optimal ensemble average estimation technique which may be Kalman filtering. The lines 702, 704, and 706, and indicate the 1×, 2×, and 3× standard deviation (σ) levels respectively in each plot. In this example simulation, a notional but realistic measurement noise value of 5 nS is assumed while a correction gain of 0.005 (i.e. 0.5% of the estimated error is applied as a correction each iteration) is being applied. Traces 708 represent the offset relative to zero time offset. The initial time offset error was set at 30 nS (nanoseconds) and the initial frequency error was set to be 1 mHz (0.001 Hz). Two-way time transfer (TWTT) between each satellite's four nearest neighbors is used to share time offset information between adjacent satellites and an optimal estimation technique which may be a Kalman Filter is used in conjunction with the frequency difference detection circuit to determine the required frequency correction that minimizes the least-square error between reference clock frequencies across the adjacent satellites. Each trace 708 represents the offset error for a single satellite. Because only a small portion of the measured correction (the amount of correction or size of the contribution being applied, which may be a fraction or percentage of the measured frequency difference) is applied on each iteration (e.g., 0.5% of the satellite's local offset), the clocks across the satellites in the constellation reach an equilibrium state in about 1½ days (120,000 seconds), in this non-limiting example. The one σ (first standard deviation) of time offset error between any two satellites in the constellation is approximately 1.6 nS in the case of this non-limiting simulation run. The lower bounds for this error is determined by the measurement uncertainty due to the sampling frequency clocks used in the TWTT process.

FIG. 7B shows the time error between satellites in a Local Group, which is the four satellites adjacent to a central satellite. The traces 710 represent the absolute value of the magnitude of time offset with respect to the central satellite node. As illustrated in FIG. 7B, the one σ (first standard deviation) time difference is approximately 1 nS after 5 days. As discussed above, the TWTT process used herein may conform to known protocols such as that described by IEEE1588-2019 (IEEE Standard for a Precision Clock Synchronization Protocol for Networked Measurement and Control Systems, incorporated herein by reference) and the like.

In some examples, the steering of the ensemble average may not be immediate, and may be selectively and variably moderated to ensure a stable ensemble average is attained. For instance, and without limitation, if a 1 mHz frequency difference is determined between a CSAC and a DO, then the contribution to the ensemble average (accomplished by two-way time transfer (TWTT) algorithms including local and remote Kalman filtering) may be on the order of, for example and without limitation, 0.1 mHz. The magnitude and frequentness of contributions to the ensemble average may vary, depending on several variables including the size of the constellation, the difference between the existing ensemble average and the local satellite frequency difference, the size of the frequency difference, and the like. For instance, a fraction or percentage or the actual measured time and frequency differences measured locally on a satellite may be contributed to the ensemble average. This may avoid unwanted instability in the calculation of the ensemble average which could be introduced by contributions happening too often or having a large magnitude. Thus, at a constellation level a stable ensemble average may take a longer period of time (e.g., minutes, hours, or days) to settle as compared with how quickly local satellite frequency difference calculations and corrections are achieved, but once the ensemble average is established the contributions of calculated local time and frequency differences (e.g., differences between DO and CSAC frequencies on various satellites) will enable the ensemble average to be far more accurate (e.g., less deviation over time) compared with existing solutions. In other examples, as the ensemble average is being calculated, the magnitude of the time correction (e.g. the time offset contribution to the ensemble average algorithm) may be larger (larger "gain") when the ensemble average is further from equilibrium (e.g., the time average still has a large variance) and the time offset contribution may be smaller (smaller "gain") as the ensemble average is nearer an equilibrium state. An equilibrium state may be a state in which the ensemble average varies by an amount less than a pre-determined threshold from one average to the next; where the mean of the ensemble average has a value which varies less than or equal to a threshold from one period to a subsequent period; and the like. An equilibrium state may also be defined when the slope or first derivative of the standard deviation value is approximately zero over a predetermine time period.

Figure 8:
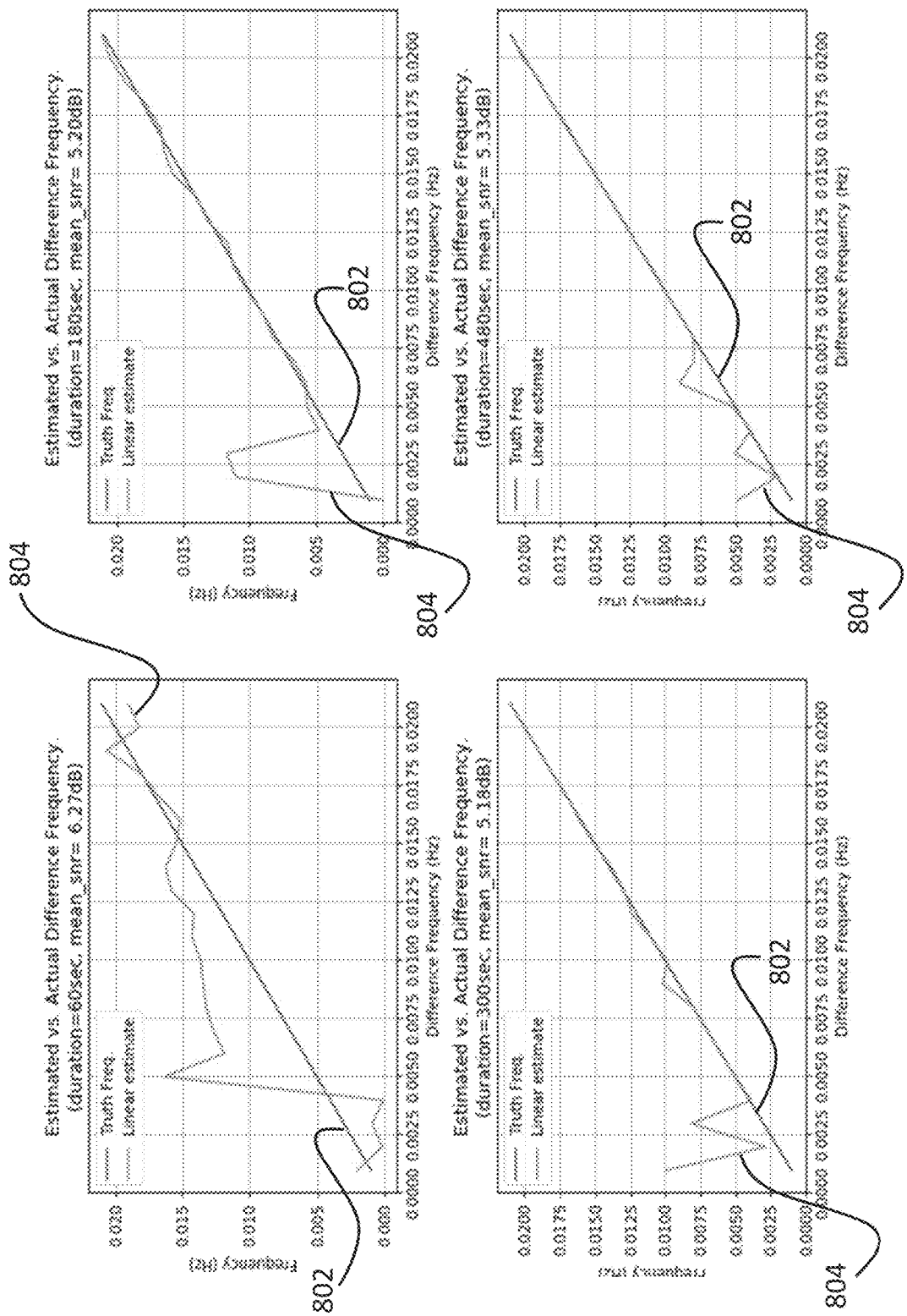
FIG. 8 depicts representative results comparing truth versus estimated difference frequency using a prior-art heterodyne-based approach.

In order to illustrate the advantages of the presently disclosed approach as compared to prior art Heterodyne-based approaches for measuring small frequency differences. FIG. 8 depicts representative results comparing true frequency difference (plot 802) versus a measured frequency difference (plot 804) using a prior-art heterodyne. In FIG. 8, noise has been added to resemble real-world applications. However heterodyne-based noiseless simulations are only marginally more accurate and even after significant duration of time, result in large signal errors when frequency differences are small. As illustrated in FIG. 8, the mean relative errors are approximately 67%, 44%, 51%, and 23% for 60, 180, 300, and 480 seconds respectively. Even in a noiseless case, the mean relative errors are approximately 44%, 15%, 9%, and 4% for 60, 180, 300, and 480 seconds respectively. This relative error reflects heterodyne approach fails to exploit the fact that both signals are of the same structure (i.e. both sinusoids in this case). A frequency of 0.001 Hz requires 1000 seconds for the sinewave to complete one cycle. In 60 seconds only 6% of a cycle is used to estimate the frequency. Even at 480 seconds, less than one-half cycle is available for making the estimate.

By comparison, the present disclosure is capable of measuring frequency differences of 1 mHz in as little as 6 seconds, with relative errors of 2.65% (error STD 7.01E-5 Hz) using a real-valued mixer and 1.90% (error STD 5.54E-6 Hz) using a virtual mixer.

Radiation Considerations

Due to the ionizing radiation environment experienced by electronics operating in satellite applications, it may be desirable for all or portions of the electronics implemented in embodiments of the present disclosure to be radiation hardened or radiation tolerant. For instance, all or a subset of the components described herein and depicted (non-exhaustively) in FIGS. 1-5 may be radiation tolerant or radiation hardened. This can include any or some combination of electronics that have been radiation hardened by process (having to do with the underlying semiconductor technology regarding how the electronic device is fabricated), by design (having to do with the physical layout of the circuit elements on the die) or by other means. Radiation tolerance may be determined via test, analysis, or test and analysis of devices whose design was not intentionally optimized for use in an ionizing radiation environment.

The harsh environment faced by a satellite can increase the challenge of designing electronic circuitry. One of the primary environmental risks in a satellite application is associated with the ionizing radiation environment present in space. It should be noted that radiation effects associated with ionizing radiation are also present in terrestrial applications and such radiation effects are generally termed soft errors. The ionizing radiation environment in space includes heavy ions, protons, and neutrons which can impact the normal operation of semiconductor devices via single event effects (SEE), total ionizing dose (TID), and/or displacement damage dose (DDD). The effects of TID and DDD are generally cumulative over the mission duration and impact semiconductor parameters including current leakage. The effects of SEE are generally instantaneous and can impact the operation of the semiconductor circuit. These SEE effects include single event latchup (SEL), single event upset (SEU), single event transient (SET), and single event functional interrupt (SEFI). Mitigation for SEL can be provided via use of a technology such as silicon on insulator (SOI). The effects of SEU, SET, and/or SEFI can include causing a serial communication line (commonly referred to as a lane) to go into an invalid state (an example would be loss of lock) in which valid data is no longer being transmitted or received for an extended period of time. The rate of occurrence of soft errors in terrestrial applications for a typical semiconductor chip design is significantly lower than the rate of occurrence of SEU, SET, and/or SEFI for the same semiconductor chip design in space applications.

Distinct from the natural radiation environment and contemplated herein are various man-made radiation environments (e.g., prompt dose, system-generated EMP effects (SGEMP), x-ray and gamma ray flashes, transient dose effects, dose-rate upset, dose-rate burnout, dose-rate metalization failure, dose-rate latch-up, dose-rate rail-span collapse, and the like). Radiation considerations and hardening vary from survivability considerations as well as operate-through conditions.

The mitigation of SEU, SET, and/or SEFI in semiconductor chip designs for space applications can be performed using a variety of techniques including the selection and optimization of materials and processing techniques in the semiconductor fabrication (radiation hard by process (RHBP)), and by the design and fabrication of specialized structures in the design of the chip which is then fabricated via conventional materials and processes in the semiconductor fabrication process (radiation hard by design (RHBD)). There are additional techniques for providing system level mitigation in systems that include semiconductor chips that are either RHBP, RHBD, or conventional (not specifically optimized for use in an ionizing radiation environment), such SEU, SET, and/or SEFI mitigation techniques are referred to in this application as system level radiation mitigation techniques (SLRMT). Other system-level radiation mitigation techniques may use error detection and correction (EDAC) temporally or spatially close to the radiation effected component (such as, for example, system-level mitigation provided on-package or on-die).

For instance, the radiation effect on a clock signal, a clock generator, clock buffer, clock prescaler, an ADC, a DAC, a DSP core, operational amplifier, or any of various calculating circuits, may be detected by other circuitry in the same package, in a different package, on the same board, or provided in the same payload. Radiation effect mitigation may be effectuated by one or more other elements in the system, rather than the circuit or module that has been impacted by a radiation event. Conversely, these elements may also be provided with logic which allows them to recover from radiation effects. In the example of clock generators, such as crystal oscillators, chip scale atomic clocks, and the like, the crystal structure or material may be chosen or designed to minimize effects of radiation effects. For example, using swept quartz (or other space-qualified materials) as the oscillation crystal may reduce or prevent TID and DDD effects over time. Furthermore, these elements may be provided with logic and circuitry to preclude radiation effects from causing damage. In the example of DSP, CPU and associated memory subsystem, circuit may be implemented to detect the signature of a radiation event such as elevated current draw and disable the power source before damage can occur.

The effective design of electronics systems for use in the space ionizing radiation environment requires that the system design team make effective and efficient use of components that are either RHBP, RHBD, and/or conventional and often includes the use of SLRMT. The optimization of the component selection and SLRMT depends to a large extent on the specific details of the radiation effects that are to be mitigated and the desired level of system radiation tolerance to be obtained. Many SEU, SET, and/or SEFI are generally best mitigated as close as possible, both spatially and temporally, to where the SEE induced event occurred in the component or system level circuit to provide effective and efficient mitigation of such effects. For example, the duration of SET induced in ASIC technology nodes with a feature size <90 nm, can be <1 nSec, and can be as short as several tens of pSec for feature sizes <32 nm. The mitigation of such short duration SET within the same semiconductor package can provide for a more efficient implementation of SET mitigation relative to an approach which spans two of more chips in separate locations within the same system. This efficiency results from the ability to detect and mitigate spatially and/or temporally close to the source of the SEE induced errors.

Radiation test may be accomplished using a beam of charged particles from a particle accelerator where the charged particle beam may include protons and/or heavy ions and the accelerator may be a cyclotron or a linear accelerator. The beam energy in the case of a proton beam may be in the range of 0.1 MeV to over 200 MeV and is typically in the range of approximately >1 MeV to either approximately 65 or 200 MeV. The beam in the case of a heavy ion beam may have a linear energy transfer (LET) in the range of 0.1 to over 100 MeV cm$^2$/mg and is typically in the range of >0.5 to approximately 60 to 85 MeV cm$^2$/mg. The total fluence of particles used in such tests can vary considerably and is often in the range of $10^6$ to over $10^{12}$ particles per cm$^2$ at each beam energy in the case of a proton beam and is often in the range of $10^2$ to over $10^8$ particles per cm$^2$ at each LET value in the case of a heavy ion beam. The number of radiation induced upsets (SEU), transients (SET), and/or functional interrupts (SEFI) is often expressed as a cross section which relates to the number of observed events in a given area (typically 1 cm$^2$) as a function of the beam fluence. The cross section is no greater than 1.0 and can be smaller than $10^{-10}$ cm$^2$, it is often in the range of approximately $10^{-2}$ to $<10^{-10}$ cm$^2$. A device is generally considered to be radiation tolerant if the number of detected SEU, SET, and/or SEFI is sufficiently small that it will not have a significant impact on the operation of the system or circuit containing one or more instances of that device. A heavy ion cross section $<10^{-4}$ cm$^2$ at a LET>37 MeV cm$^2$/mg as demonstrated by test and/or analysis is an example of a cross section which may be sufficient to be demonstrate that a given device is radiation tolerant. The heavy ion or proton cross section that is measured or determined by analysis for a device at one or more beam LET values or beam energy values to be considered radiation tolerant may vary considerably and depends in part on the anticipated orbit for the satellite and the extent to which the circuit and/or system containing that device is capable of maintaining the desired operation when a SEU, SET, and/or SEFI occurs.

Some or all electrical components disclosed in the present disclosure may include at least some type of radiation hardening, radiation tolerance, radiation mitigation logic, and/or compensation. Accordingly, all or portions of the ADCs, DACs, R2IQ switches, local oscillators, PLLs, LPF circuits, frequency difference detection circuits, FPGAs, ASICs, structured ASICs, CPUs, mixers, SerDes, operational amplifiers, clock distribution buffer, clock prescaler, and circuit input/outputs may be radiation tolerant, radiation hardened, or monitored for radiation effects which are mitigated by other processing steps. In some examples, partial or complete triple modular redundancy (TMR) may be provided at the potential expense of additional die space or power consumption. In other examples, the use of library cells having physical designs optimized to reduce the probability of SEEs may be used. The implementation of the algorithm of the present disclosure may be best accomplished with a mixture of operational amplifiers, CPUs, ASICs, structured ASICs, and/or FPGAs, coupled with radiation mitigation algorithms in DSP processors, in the logic of individual elements, and the like. This may in some examples include scrubbing algorithms and processes and off-package radiation effects detection and radiation mitigation triggering.

Although only certain exemplary embodiments and methods have been described in detail above, those skilled in the art will readily appreciate that many modifications are possible to the exemplary embodiments and methods without materially departing from the novel teachings and advantages of this disclosure.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present invention, and do not create limitations, particularly as to the position, orientation, or use of the invention. Connection references (e.g., attached, coupled, connected, and joined) may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary.

The above specification, examples and data provide a complete description of the structure and use of exemplary embodiments of the invention as defined in the claims. Although various embodiments of the claimed invention have been described above with a certain degree of particularity, or with reference to one or more individual embodiments, those skilled in the art could make numerous alterations to the disclosed embodiments without departing from the spirit or scope of the claimed invention. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claim.

What is claimed is:

1. A method of synchronizing clocks in a space-based electronic system comprising:
   providing, by a first clock source, a first clock signal having a first frequency;
   providing, by a second clock source, a second clock signal having a second frequency that is capable of being varied based on a tuning signal;
   converting, by an analog to digital converter (ADC), the first clock signal to a digital first clock signal, wherein the ADC is sampled at a sampling frequency;

converting, by a real-to-IQ (R2IQ) switch, the digital first clock signal to an in-phase (I) component and a quadrature (Q) component, wherein the R2IQ switch is clocked at the sampling frequency;

demodulating, by the R2IQ switch, the in-phase (I) component and the quadrature (Q) component of the first clock signal to generate a frequency difference signal;

extracting, by a phase detection circuit, a phase of the frequency difference signal;

estimating, by a frequency estimator circuit, a frequency offset between the first frequency and the second frequency based on a slope of the phase of the frequency difference signal;

setting, by a frequency tuning circuit, a tuning signal based on the frequency offset and adjusting the second frequency by the tuning signal to generate a corrected second clock signal;

providing a contribution based on the frequency offset to an ensemble averaging circuit; and calculating, with the ensemble averaging circuit, an average time signal of two or more electronic systems based on the contribution.

2. The method of claim 1, wherein the tuning signal is based on the frequency offset, and wherein adjusting the second frequency by the tuning signal modifies the second frequency to be substantially equal to the first frequency.

3. The method of claim 1, wherein the sampling frequency is based on the second frequency of the second clock signal.

4. The method of claim 3, wherein the sampling frequency is a multiple N of the Nyquist frequency of the second frequency, where N is a value between 1.1 and 5.

5. The method of claim 3, wherein the sampling frequency is four times the second frequency.

6. The method of claim 1, wherein the ensemble averaging circuit is provided on the space-based electronic system.

7. The method of claim 1, wherein the ensemble averaging circuit is provided on a second space-based electronic system, and wherein the contribution is transmitted, by a transmit antenna, to the second space-based electronic system.

8. The method of claim 1, wherein the contribution is a fraction of the frequency offset.

9. The method of claim 1, wherein a magnitude of the contribution is variable.

10. The method of claim 1, further comprising:

providing, by a two-way time transfer circuit, the corrected second clock signal or a contribution based on the frequency offset to the ensemble averaging circuit; and calculating, by the ensemble averaging circuit, the average time signal of two or more space-based electronic systems.

11. The method of claim 1, wherein the R2IQ switch comprises a 1:2 demultiplexer, a timing circuit, and sign inversion logic.

12. The method of claim 1, further comprising converting, with the R2IQ switch, samples of the first frequency in an I, Q, −I, −Q pattern.

13. The method of claim 12, further comprising, with the R2IQ switch:

converting a first sample of the first frequency to an in-phase (I) component;

converting a second sample of the first frequency to quadrature (Q) component;

converting a third sample of the first frequency to an inverted in-phase component (−I); and converting a fourth sample of the first frequency to an inverted quadrature (−Q) component.

14. The method of claim 13, further comprising, with the R2IQ switch:

converting a fifth sample of the first frequency to an in-phase (I) component;

converting a sixth sample of the first frequency to quadrature (Q) component;

converting a seventh sample of the first frequency to an inverted in-phase component (−I); and converting an eighth sample of the first frequency to an inverted quadrature (−Q) component.

15. The method of claim 1, wherein the first clock source is an atomic clock source and the second clock source is a tunable clock source.

16. The method of claim 1, wherein the first clock source is a chip-scale atomic clock (CSAC) clock source and the second clock source is one of a disciplined crystal oscillator (DO) and an oven-controlled crystal oscillator (OCXO).

17. A satellite payload comprising a processor, memory, and a program stored in the memory, the program configured to be executed by the processor to perform the method of claim 1.

18. A method of synchronizing clocks in a space-based electronic system comprising:

providing, by a first clock source, a first clock signal having a first frequency;

providing, by a second clock source, a second clock signal having a second frequency that is capable of being varied based on a tuning signal;

converting, by an analog to digital converter (ADC), the first clock signal to a digital first clock signal, wherein the ADC is sampled at a sampling frequency;

converting, by a real-to-IQ (R2IQ) switch, the digital first clock signal to an in-phase (I) component and a quadrature (Q) component, wherein the R2IQ switch is clocked at the sampling frequency;

demodulating, by the R2IQ switch, the in-phase (I) component and the quadrature (Q) component of the first clock signal to generate a frequency difference signal;

extracting, by a phase detection circuit, a phase of the frequency difference signal;

estimating, by a frequency estimator circuit, a frequency offset between the first frequency and the second frequency based on a slope of the phase of the frequency difference signal;

setting, by a frequency tuning circuit, a tuning signal based on the frequency offset and adjusting the second frequency by the tuning signal to generate a corrected second clock signal;

wherein the sampling frequency is based on the second frequency of the second clock signal and is a multiple N of the Nyquist frequency of the second frequency, where N is a value between 1.1 and 5.

19. A space-based system for synchronizing clocks in a constellation of satellites, the system comprising:

one or more satellites, each satellite comprising:

a first clock signal source for providing a first clock signal at a first frequency;

a second clock signal source for providing a second clock signal at a second frequency, the second clock signal capable of being varied based on a tuning signal;

an ADC for converting the first clock signal to a digital first clock signal, wherein the ADC is configured to sample at a sampling frequency;

a frequency difference detection (FDD) circuit configured to determine a frequency difference between the first frequency and the second frequency, the frequency difference detection circuit comprising:
  a R2IQ switch for:
    converting the digital first clock signal to an in-phase (I) component and a quadrature (Q) component, wherein the R2IQ switch is clocked at the sampling frequency, and
    demodulating the in-phase (I) component and the quadrature (Q) component of the first clock signal to generate a frequency difference signal,
  a phase detection circuit for extracting a phase of the frequency difference signal, and
  a frequency estimator circuit for estimating a frequency offset between the first frequency and the second frequency based on a slope of the phase of the frequency difference signal;
a frequency tuning circuit for setting a tuning signal based on the frequency offset, wherein a corrected second clock signal is generated by adjusting the second frequency based on the tuning signal; and
an ensemble averaging circuit for calculating an average time signal of two or more electronic systems based on a contribution, wherein the contribution is provided to the ensemble averaging circuit based on the frequency offset.

* * * * *